United States Patent
Tan et al.

(10) Patent No.: US 11,630,003 B2
(45) Date of Patent: Apr. 18, 2023

(54) TEMPERATURE CONTROL SYSTEM FOR CENTRAL PROCESSING UNIT AND TEMPERATURE CONTROL METHOD THEREOF

(71) Applicant: ASUSTEK COMPUTER INC., Taipei (TW)

(72) Inventors: Ji-Kuang Tan, Taipei (TW); Wei-Ming Chen, Taipei (TW); Chen-Wei Fan, Taipei (TW); Teng-Liang Ng, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 693 days.

(21) Appl. No.: 16/557,024

(22) Filed: Aug. 30, 2019

(65) Prior Publication Data

US 2020/0080902 A1    Mar. 12, 2020

(30) Foreign Application Priority Data

Sep. 7, 2018    (TW) ................. 107131570

(51) Int. Cl.
*G06F 1/00* (2006.01)
*G01K 7/42* (2006.01)
(Continued)

(52) U.S. Cl.
CPC ........... *G01K 7/425* (2013.01); *G06F 1/206* (2013.01); *G06F 1/324* (2013.01); *G06F 1/3296* (2013.01);
(Continued)

(58) Field of Classification Search
CPC ......... G01K 7/425; G06F 1/206; G06F 1/324; G06F 1/3296; G06F 11/3024;
(Continued)

(56) References Cited

U.S. PATENT DOCUMENTS

| | | | |
|---|---|---|---|
| 7,036,030 B1* | 4/2006 | Altmejd | G06F 1/324 713/322 |
| 2015/0194969 A1* | 7/2015 | Kawabe | G06F 1/3243 327/114 |

(Continued)

FOREIGN PATENT DOCUMENTS

| | | |
|---|---|---|
| CN | 1369759 A | 9/2002 |
| CN | 102110040 A | 6/2011 |

(Continued)

*Primary Examiner* — Xuxing Chen
(74) *Attorney, Agent, or Firm* — Muncy, Geissler, Olds & Lowe, P.C.

(57) ABSTRACT

A temperature control system, adapted to a central processing unit powered by a power supply module of an electronic device, is provided. The temperature control system includes a setting module, a first temperature detecting module, a second temperature detecting module, and a power adjusting module. The setting module is configured to set a target temperature of the CPU and a target temperature of the power supply module. The first temperature detecting module is configured to obtain a detected temperature of the CPU. The second temperature detecting module is electrically connected to the power supply module, to obtain a detected temperature of the power supply module. The power adjusting module is configured to adjust a control parameter of the CPU or the power supply module based on a first temperature difference between the target temperature of the CPU and the detected temperature of the CPU or a second temperature difference between the target temperature of the power supply module and the detected temperature of the power supply module.

1 Claim, 6 Drawing Sheets

(51) Int. Cl.
  *G06F 1/20* (2006.01)
  *G06F 11/30* (2006.01)
  *G06F 1/3296* (2019.01)
  *G06F 1/324* (2019.01)

(52) U.S. Cl.
  CPC ...... *G06F 11/3024* (2013.01); *G06F 11/3062* (2013.01)

(58) Field of Classification Search
  CPC .............. G06F 11/3062; G06F 1/3206; G06F 2201/81; G06F 11/3058
  See application file for complete search history.

(56) References Cited

U.S. PATENT DOCUMENTS

| | | | |
|---|---|---|---|
| 2017/0351279 A1* | 12/2017 | Ishii | G06F 1/203 |
| 2018/0232032 A1 | 8/2018 | Wang et al. | |
| 2018/0321735 A1* | 11/2018 | Luo | G06F 1/206 |
| 2019/0286200 A1* | 9/2019 | Ho | G06F 1/1694 |
| 2020/0026338 A1* | 1/2020 | Maddukuri | G06F 1/206 |
| 2020/0073456 A1* | 3/2020 | Nguyen | G06F 1/3296 |
| 2020/0150732 A1* | 5/2020 | Li | F28D 20/02 |

FOREIGN PATENT DOCUMENTS

| | | |
|---|---|---|
| CN | 102200825 A | 9/2011 |
| CN | 102410237 A | 4/2012 |
| CN | 105245726 A | 1/2016 |
| CN | 107102707 A | 8/2017 |
| CN | 107329560 A | 11/2017 |
| TW | I563371 B | 12/2016 |

\* cited by examiner

TEMPERATURE CONTROL SYSTEM FOR CENTRAL PROCESSING UNIT AND TEMPERATURE CONTROL METHOD THEREOF

CROSS-REFERENCE TO RELATED APPLICATION

This application claims the priority benefit of Taiwan Application Serial No. 107131570, filed on Sep. 7, 2018. The entirety of the above-mentioned patent application is hereby incorporated by reference herein and made a part of the specification.

BACKGROUND OF THE INVENTION

Field of the Invention

The disclosure relates to an electronic apparatus and, more particularly, to a temperature control system and a temperature control method to the electronic apparatus.

Description of the Related Art

More and more users use monitoring software to detect computer conditions, especially temperatures of CPUs, to ensure efficiency of computers and prevent computers from being overheated to shorten service life.

However, each user has different sensitivity for temperature. Conventional monitoring software determines whether a computer is overheated or not only by a default temperature value, which cannot provide more information for more usage application.

BRIEF SUMMARY OF THE INVENTION

The disclosure provides a temperature control system, adapted to a CPU of an electronic device. The CPU is powered by a power supply module. The temperature control system includes a setting module, a first temperature detecting module, a second temperature detecting module, and a power adjusting module. The setting module is configured to set a target temperature of the CPU and a target temperature of the power supply module.

The first temperature detecting module is electrically connected to the CPU to obtain a detected temperature of the CPU. The second temperature detecting module is electrically connected to the power supply module to obtain a detected temperature of the power supply module. The power adjusting module is configured to adjust a control parameter of the CPU or the power supply module based on a first temperature difference or a second temperature difference. The first temperature difference is between the target temperature of the CPU and the detected temperature of the CPU. The second temperature difference is between the target temperature of the power supply module and the detected temperature of the power supply module.

The disclosure provides a temperature control method, adapted to a CPU. The CPU is powered by a power supply module. The temperature control method includes the following steps. A target temperature of the CPU and a target temperature of the power supply module are set. A detected temperature of the CPU is obtained. A detected temperature of the power supply module is obtained. A control parameter of the CPU or the power supply module is adjusted based on a first temperature difference or a second temperature difference. The first temperature difference is between the target temperature of the CPU and the detected temperature of the CPU. The second temperature difference is between the target temperature of the power supply module and the detected temperature of the power supply module.

For the temperature control system and the temperature control method provided by the disclosure, the target temperatures of the CPU and the power supply module are set by a user, and the control parameter of the CPU or the power supply module is dynamically adjusted according to the set target temperatures, so that detected actual temperatures stably varied within the target temperatures. Specific embodiments of the disclosure will be further described by using the following examples and drawings.

DETAILED DESCRIPTION OF THE EMBODIMENTS

Specific embodiments of the disclosure will be described in further detail below with reference to schematic drawings. The advantages and features of the disclosure will become more apparent from the following description and claims. It should be noted that the drawings are all in a very simplified form and are not drawn to accurate scale, but are merely used for convenience and clarity of description of the embodiments of the disclosure.

Figure 1:
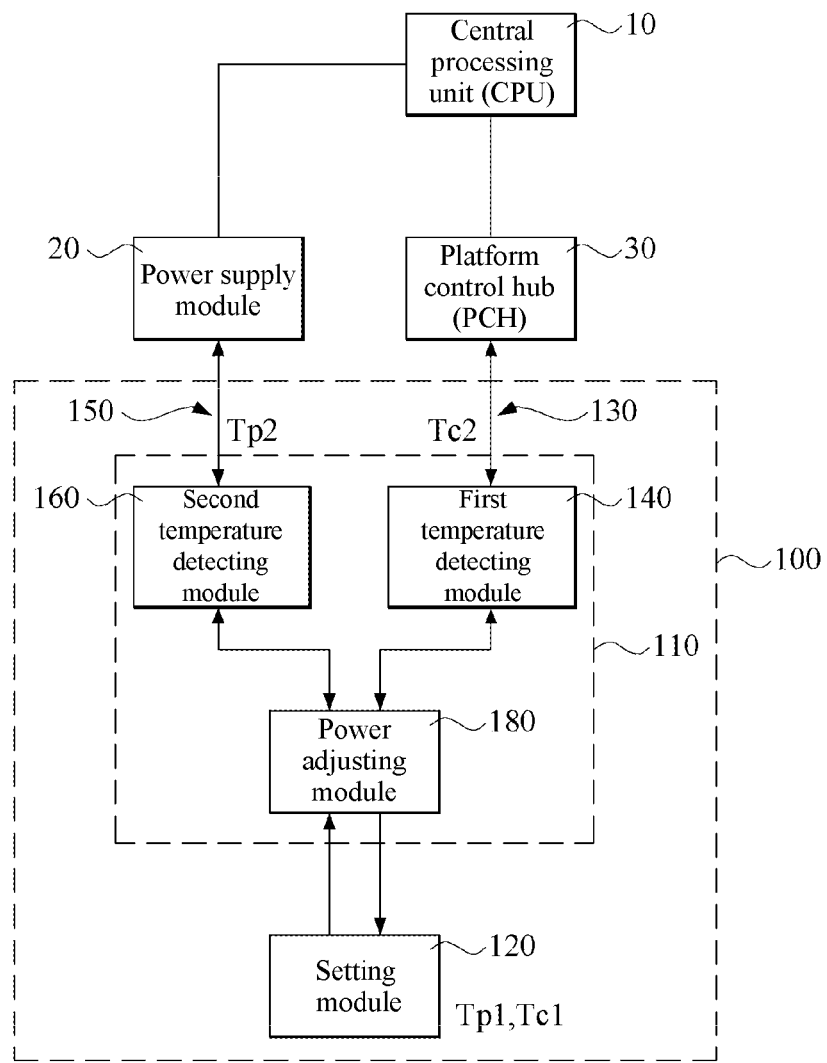
FIG. 1 is a schematic block diagram of an embodiment of a temperature control system according to the disclosure.

FIG. 1 is a schematic block diagram of an embodiment of a temperature control system according to the disclosure. As shown in FIG. 1, the temperature control system in this embodiment is adapted to a central processing unit (CPU) 10. The CPU 10 is powered by a power supply module 20. In an embodiment, the power supply module 20 includes a voltage regulation module configured to convert an external power supply to a voltage required by operation of the CPU 10.

The temperature control system 100 includes a setting module 120, a first temperature detecting module 140, a second temperature detecting module 160, and a power adjusting module 180. The setting module 120 is configured to adjustably set a target temperature Tc1 of the CPU and a target temperature Tp1 of the power supply module. The first temperature detecting module 140 is electrically connected to the CPU 10, to obtain a detected temperature Tc2 of the CPU 10.

In an embodiment, the detected temperature of the CPU is detected by a temperature detecting element in the CPU 10. As shown in FIG. 1, the first temperature detecting module 140 is electrically connected to the CPU 10 through a platform control hub (PCH) 30, to obtain a detected temperature Tc2 of the CPU.

The second temperature detecting module 160 is electrically connected to the power supply module 20, to obtain a detected temperature Tp2 of the power supply module 20. In an embodiment, the detected temperature Tp2 of the power supply module is detected by a temperature detecting element in the power supply module 20.

In an embodiment, the temperature detecting element detects a temperature of a power control IC, a circuit board, or another key electronic part in the power supply module 20.

The power adjusting module 180 adjusts a control parameter of the CPU 10 or the power supply module based on a first temperature difference $\Delta T1$, $\Delta T1=Tc1-Tc2$, between the target temperature Tc1 of the CPU and the detected temperature Tc2 of the CPU, or a second temperature difference $\Delta T2$, $\Delta T2=Tp1-Tp2$, between the target temperature Tp1 of the power supply module and the detected temperature Tp2 of the power supply module. In this embodiment, the control parameter is a power limit value P1.

The power limit value P1 is a power consumption upper limit of operation of the CPU 10. In an embodiment, when the first temperature difference $\Delta T1$ or the second temperature difference $\Delta T2$ is less than zero, the power limit value P1 is adjusted to be less than a predetermined thermal design power (TDP) of the CPU, and when the first temperature difference $\Delta T1$ or the second temperature difference $\Delta T2$ is greater than zero, the power limit value P1 is adjusted to be greater than the TDP of the CPU.

Figure 2:
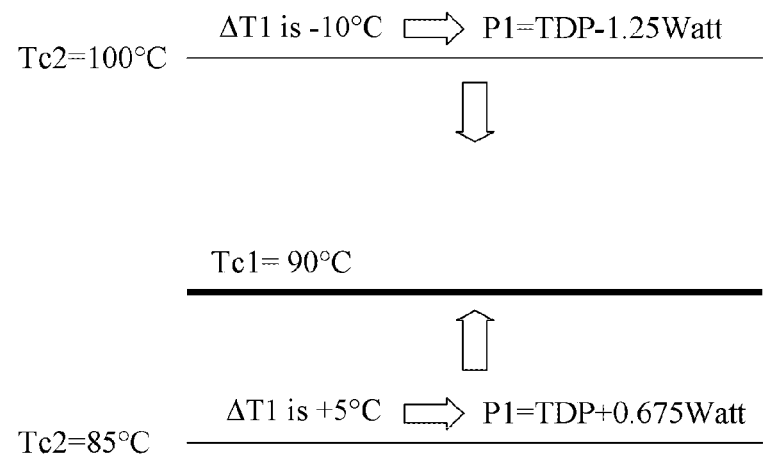
FIGS. 2 and 3 are an embodiment displaying an operation manner of the power adjusting module of the disclosure and a temperature stabilizing effect.
Figure 3:

Referring to both FIGS. 2 and 3, FIGS. 2 and 3 are an embodiment displaying an operation manner of the power adjusting module 180 of the disclosure and a temperature stabilizing effect.

It should be noted that, in this embodiment, the target temperature Tc1 of the CPU and the detected temperature Tc2 of the CPU are taken as an example to describe an operation manner of the power adjusting module 180.

However, the operation manner is also suitable for the target temperature Tp1 of the power supply module and the detected temperature Tp2 of the power supply module.

In an embodiment, a user sets the target temperature Tc1 of the CPU as 90° through the setting module 120. The power adjusting module 180 adjusts the power limit value P1 of the CPU 10 according to the first temperature difference $\Delta T1$, that is, $\Delta T1=Tc1-Tc2$, between the target temperature Tc1 of the CPU and the detected temperature Tc2 of the CPU.

When the detected temperature Tc2 of the CPU is 100°, the first temperature difference $\Delta T1$ is $-10°$, the power adjusting module 180 adjusts the power limit value P1 of the CPU 10 according to an arithmetic formula 0.125 Watt$\times\Delta T1$, the power limit value P1 at the beginning is TDP, and the power limit value P1 is adjusted to be TDP$-1.25$ Watt. On the contrary, if the detected temperature Tc2 of the CPU is 85° C. and the first temperature difference $\Delta T1$ is 5° C., the power limit value P1 of the CPU 10 is adjusted according to the arithmetic formula 0.125 Watt$\times\Delta T1$, and the power limit value P1 is adjusted to be TDP$+0.675$ Watt. Through the foregoing processing manner, an actual temperature of the CPU 10 is stabilized and close to the target temperature Tc1 of the CPU, as shown in FIG. 3.

In the foregoing embodiment, an adjustment range (including increasing and decreasing) of the power limit value P1 is calculated according to the arithmetic formula 0.125 Watt$\times\Delta T1$. However, the disclosure is not limited thereto. First, the value 0.125 in the arithmetic formula is adjusted depending on demand. If the value is greater, the power adjusting module 180 reacts to the temperature more quickly, and when the value is smaller, fine adjustment is performed better. Secondly, for increasing and decreasing of the power limit value P1, the power adjusting module 180 is also suitable for a different processing manner. In an embodiment, when $\Delta T1$ is less than zero, the power adjusting module 180 calculates a decreasing range of the power limit value P1 according to the arithmetic formula 0.125 Watt$\times\Delta T1$. However, if $\Delta T1$ is greater than zero, the power adjusting module 180 relieves the power consumption upper limit of the CPU 10.

In the foregoing embodiment, the power adjusting module 180 deals with generation of the first temperature difference $\Delta T1$ or the second temperature difference $\Delta T2$ by adjusting the power limit value P1. However, the disclosure is not limited thereto. In another embodiment, the power adjusting module 180 deals with generation of the first temperature difference $\Delta T1$ or the second temperature different $\Delta T2$ by adjusting a control parameter of the power supply module, such as a current upper limit and an output power upper limit.

As shown in the figures, in an embodiment, the CPU 10, the power supply module 20, and the first temperature detecting module 140, the second temperature detecting module 160, and the power adjusting module 180 of the temperature control system 100 are disposed on a mainboard in a form of hardware. The first temperature detecting module 140, the second temperature detecting module 160, and the power adjusting module 180 of the temperature control system 100 are disposed in an embedded controller (EC) 110. However, the disclosure is not limited thereto. The first temperature detecting module 140, the second temperature detecting module 160, and the power adjusting module 180 of the temperature control system 100 are also disposed in a micro controller unit (MCU).

The EC 110 is electrically connected to the CPU 10 through a first bus 130 and is electrically connected to the power supply module 20 through a second bus 150. Therefore, the first detecting module 140 is electrically connected to the CPU 10 through the first bus 130 and the second detecting module 160 is electrically connected to the power supply module 20 through the second bus 150. In an embodiment, the first bus 130 is a system management bus (SMbus), and the second bus 150 is a SMbus. However, the disclosure is not limited thereto. Any path for information transmission disposed on the mainboard is suitable for information transmission between the EC 110 and the CPU 10 or the power supply module 20 in the disclosure.

In an embodiment, the setting module 120 is software or firmware, for example, a BIOS. In another embodiment, the setting module 120 is disposed in the EC 110 in a form of hardware.

Figure 4:
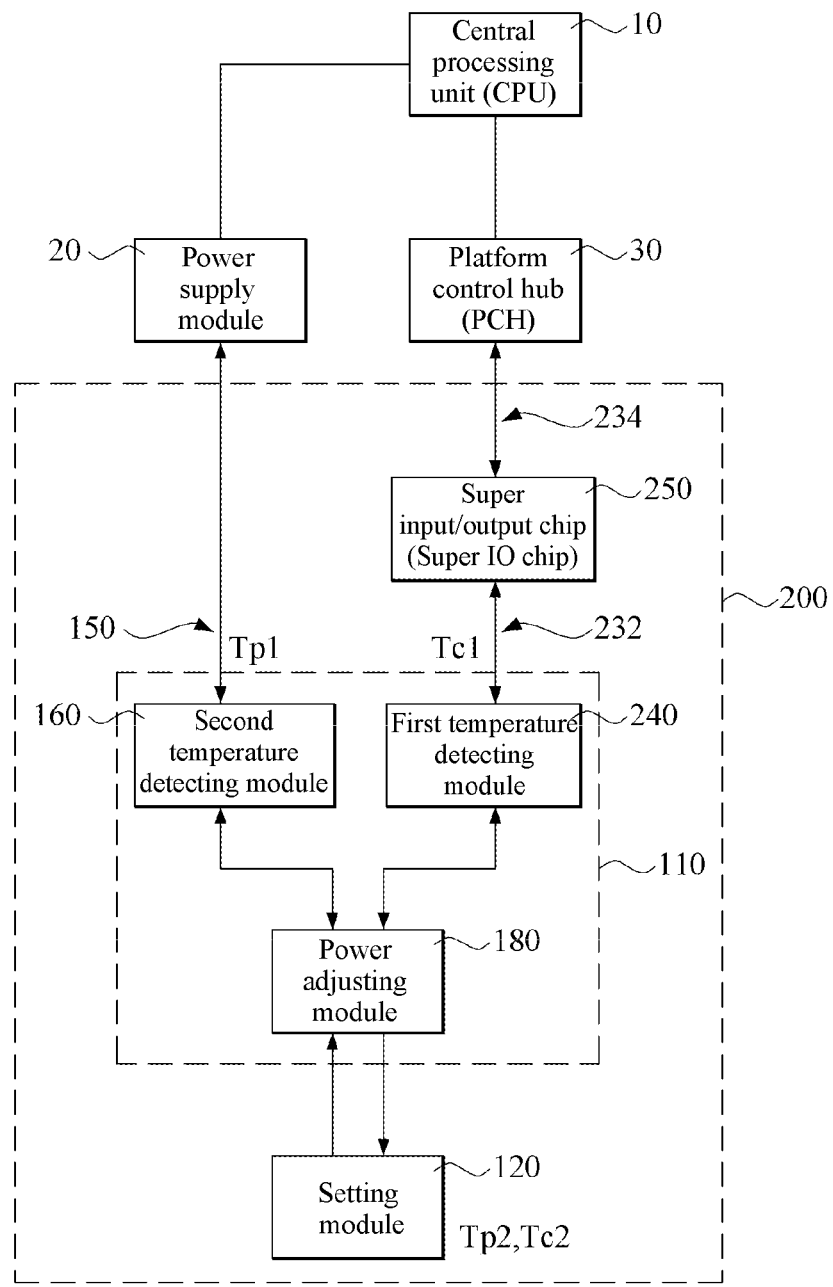
FIG. 4 is a schematic block diagram of another embodiment of a temperature control system according to the disclosure.

FIG. 4 is a schematic block diagram of another embodiment of a temperature control system according to the disclosure. Compared with the embodiment in FIG. 1, the first temperature detecting module 240 of the temperature control system 200 in this embodiment is electrically connected to an input/output control interface through a third bus 232, for example, a super input/output chip (Super IO chip) 250, and then is electrically connected to the CPU 10 through a fourth bus 234 from the input/output control interface.

In an embodiment, the third bus 232 is a platform environmental control interface (PECI) bus, and the fourth bus 234 is a SMbus. However, the disclosure is not limited thereto. Any path for information transmission disposed on the mainboard is suitable for information transmission among the first temperature detecting module 240, the super input/output chip 250, and the CPU 10 in the disclosure.

Figure 5:
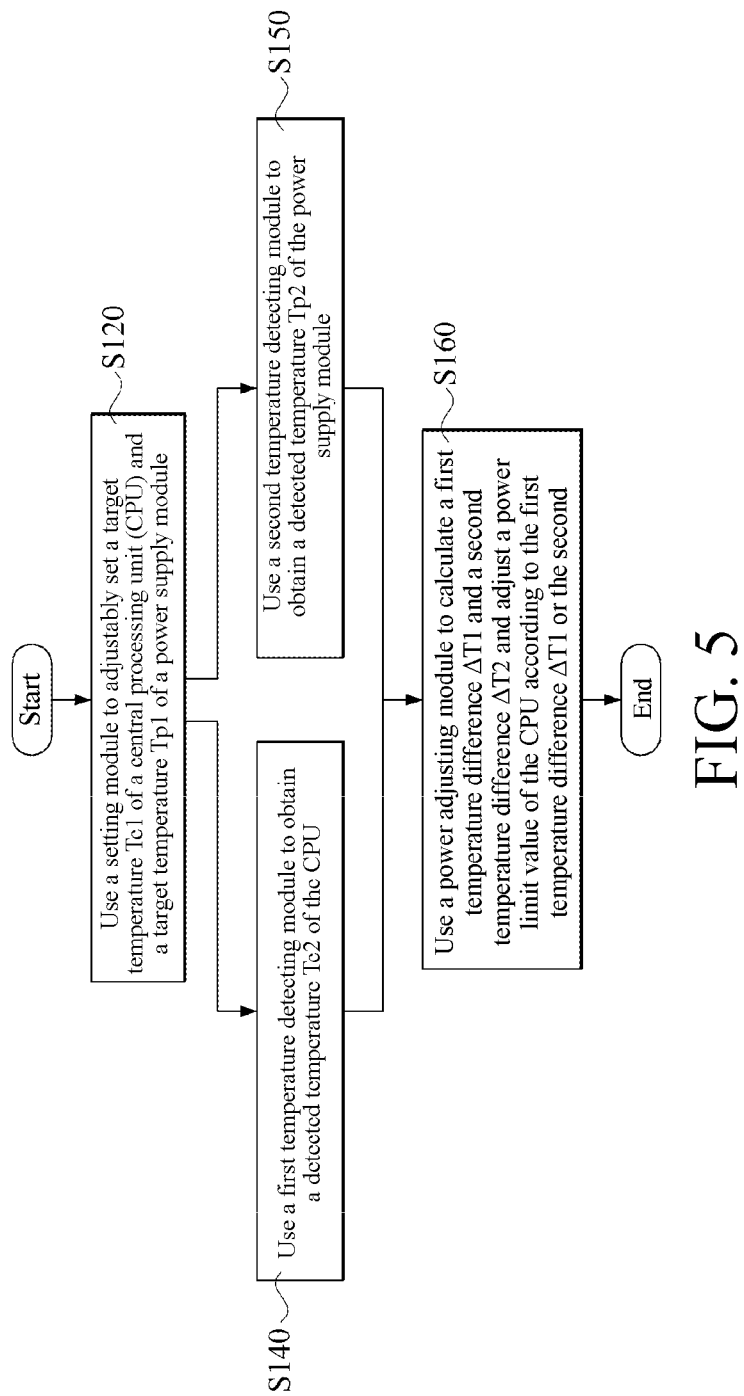
FIG. 5 is a flowchart of an embodiment of a temperature control method according to the disclosure.

FIG. 5 is a flowchart of an embodiment of a temperature control method according to the disclosure. Referring to FIG. 1 at the same time, the temperature control method is also suitable for the CPU 10. The CPU 10 is powered by the power supply module 20. The temperature control method includes the following steps.

First, as shown in step S120, the setting module 120 is used to adjustably set the target temperature Tc1 of the CPU and the target temperature Tp1 of the power supply module.

Then, as shown in step S140, the first temperature detecting module 140 electrically connected to the CPU 10 is used to obtain the detected temperature Tc2 of the CPU 10. In another aspect, as shown in step S150, the second temperature detecting module 160 electrically connected to the power supply module 20 is used to obtain the detected temperature Tp2 of the power supply module 20.

Then, as shown in step S160, the power adjusting module 180 is used to calculate a first temperature difference $\Delta T1$, $\Delta T1=Tc1-Tc2$, between the target temperature Tc1 of the CPU set in the foregoing step S120 and the detected temperature Tc2 of the CPU detected in the foregoing step S140, and a second temperature difference $\Delta T2$, $\Delta T2=Tp1-Tp2$, between the target temperature Tp1 of the power supply module set in the foregoing step S120 and the detected temperature Tp2 of the power supply module detected in the foregoing step S150, and adjust a control parameter of the CPU 10 according to the first temperature difference $\Delta T1$ or the second temperature different $\Delta T2$. In this embodiment, the control parameter is the power limit value P1 of the CPU 10. In an embodiment, the power limit value P1 is a power consumption upper limit of the CPU.

Figure 6:
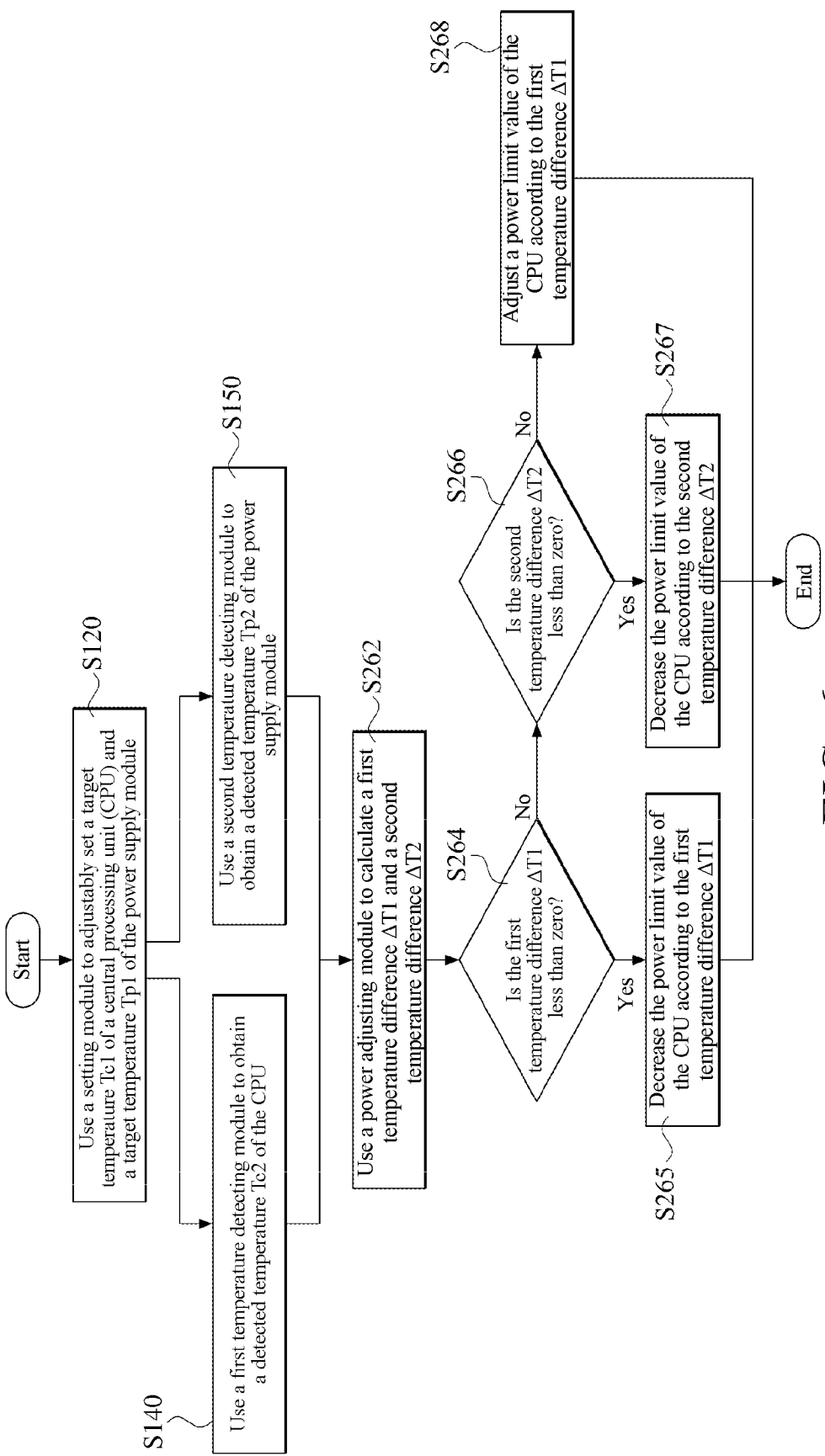
FIG. 6 is a flowchart of another embodiment of a temperature control method according to the disclosure.

FIG. 6 is a flowchart of another embodiment of a temperature control method according to the disclosure. This embodiment is mainly different from the embodiment in FIG. 5 in an adjusting step of the power limit value P1 (that is, step S160). Other steps (that is, steps S120, S140, and S150) are the same as those in the embodiment in FIG. 5 and will not repeated herein.

As shown in step S262, the power adjusting module 180 is used to calculate a first temperature difference $\Delta T1$, $\Delta T1=Tc1-Tc2$, between the target temperature Tc1 of the CPU set in step S120 and the detected temperature Tc2 of the CPU detected in step S140, and a second temperature difference $\Delta T2$, $\Delta T2=Tp1-Tp2$, between the target temperature Tp1 of the power supply module set in step S120 and the detected temperature Tp2 of the power supply module detected in step S150.

Then, as shown in step S264, whether the first temperature difference $\Delta T1$ is less than zero is determined. If the first temperature difference $\Delta T1$ is less than zero, as shown in step S265, the power limit value P1 of the CPU 10 is decreased according to the first temperature difference $\Delta T1$. If the first temperature difference $\Delta T1$ is not less than zero, step S266 is performed.

In step S266, whether the second temperature difference $\Delta T2$ is less than zero is determined. If the second temperature difference $\Delta T2$ is less than zero, as shown in step S267, the power limit value P1 of the CPU 10 is decreased according to the second temperature difference $\Delta T2$. If the second temperature difference $\Delta T2$ is not less than zero, as shown in step S268, the power limit value P1 of the CPU 10 is adjusted according to the second temperature difference $\Delta T2$.

In this embodiment, only when the first temperature difference $\Delta T1$ and the second temperature difference $\Delta T2$ are both greater than zero, the power limit value P1 of the CPU 10 is increased according to the first temperature difference $\Delta T1$. If the first temperature difference $\Delta T1$ is greater than zero and the second temperature difference $\Delta T2$ is less than zero, the power limit value P1 of the CPU 10 is decreased according to the second temperature difference $\Delta T2$. If the first temperature difference $\Delta T1$ is less than zero and the second temperature difference $\Delta T2$ is greater than zero, the power limit value P1 of the CPU 10 is decreased according to the first temperature difference $\Delta T1$. Furthermore, if the first temperature difference $\Delta T1$ and the second temperature difference $\Delta T2$ are both less than zero, the power limit value P1 of the CPU 10 is decreased according to the first temperature difference $\Delta T1$.

However, the disclosure is not limited thereto. In an embodiment, when the first temperature difference $\Delta T1$ and the second temperature difference $\Delta T2$ are both greater than zero, the power limit value P1 of the CPU 10 is increased according to the second temperature difference $\Delta T2$.

In an embodiment, when the first temperature difference $\Delta T1$ and the second temperature difference $\Delta T2$ are both less than zero, the power limit value P1 of the CPU 10 is decreased according to the first temperature difference $\Delta T1$ or the second temperature difference $\Delta T2$, and if the first temperature difference $\Delta T1$ or the second temperature difference $\Delta T2$ is greater than zero, the power limit value P1 of the CPU 10 is increased.

Figure 7:
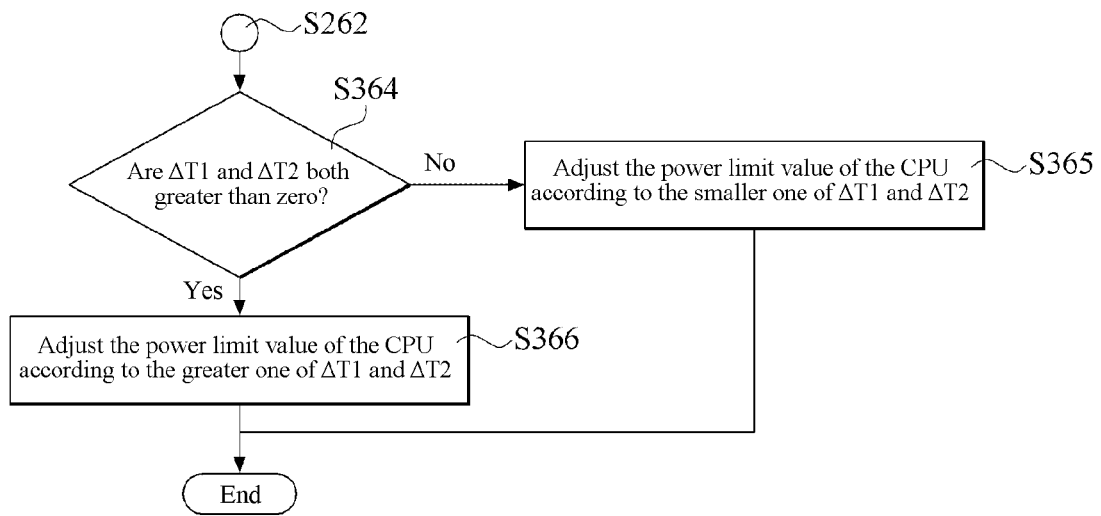
FIG. 7 is a flowchart of still another embodiment of a temperature control method according to the disclosure.

FIG. 7 is a flowchart of still another embodiment of a temperature control method according to the disclosure. The procedure shown in FIG. 7 follows step S262 in FIG. 6.

After calculating the first temperature difference $\Delta T1$ and the second temperature difference $\Delta T2$ in step S262, as shown in step S364, first, determine whether the first temperature difference $\Delta T1$ and the second temperature difference $\Delta T2$ are both greater than zero.

If a determining result of step S364 is no, as shown in step S365, according to the smaller one of the first temperature difference $\Delta T1$ and the second temperature difference $\Delta T2$, the power limit value P1 of the CPU 10 is decreased.

If a determining result of step S364 is no, as shown in step S366, according to the greater one of the first temperature difference $\Delta T1$ and the second temperature difference $\Delta T2$, the power limit value P1 of the CPU 10 is decreased.

For conventional computer monitoring software, a user only passively determines whether a computer is overheated according to a given temperature value by the computer monitoring software.

By comparison, for the temperature control system 100 and the temperature control method provided by the disclosure, the target temperatures Tc1 and Tp1 of the CPU 10 and the power supply module 20 are set by a user, and the control parameter of the CPU or the power supply module is dynamically adjusted according to the set target temperatures Tc1 and Tp1, so that detected actual temperatures are stabilized at the target temperatures.

The foregoing descriptions are merely preferred embodiments of the disclosure and are not intended to limit the disclosure in any way. Any person skilled in the art can make any form of equivalent replacement or modification to the technical means and technical contents disclosed by the disclosure without departing from the scope of the technical means of the disclosure, and such equivalent replacement or modification does not depart from the contents of the technical means of the present disclosure and still falls within the protection scope of the disclosure.

What is claimed is:

1. A temperature control method, adapted to a temperature control system that is adapted to a central processing unit powered by a power supply module of an electronic device, comprising:
    setting a target temperature of the CPU and a target temperature of the power supply module;
    obtaining a detected temperature of the CPU;
    obtaining a detected temperature of the power supply module;
    determining whether both a first temperature difference between the target temperature of the CPU and the detected temperature of the CPU and a second temperature difference between the target temperature of the power supply module and the detected temperature of the power supply module are greater than zero; and
    adjusting a control parameter of the CPU based on a greater one of the first temperature difference and the second temperature difference when both the first temperature difference and the second temperature difference are greater than zero.

* * * * *